July 28, 1970          J. C. FARRIS          3,521,714

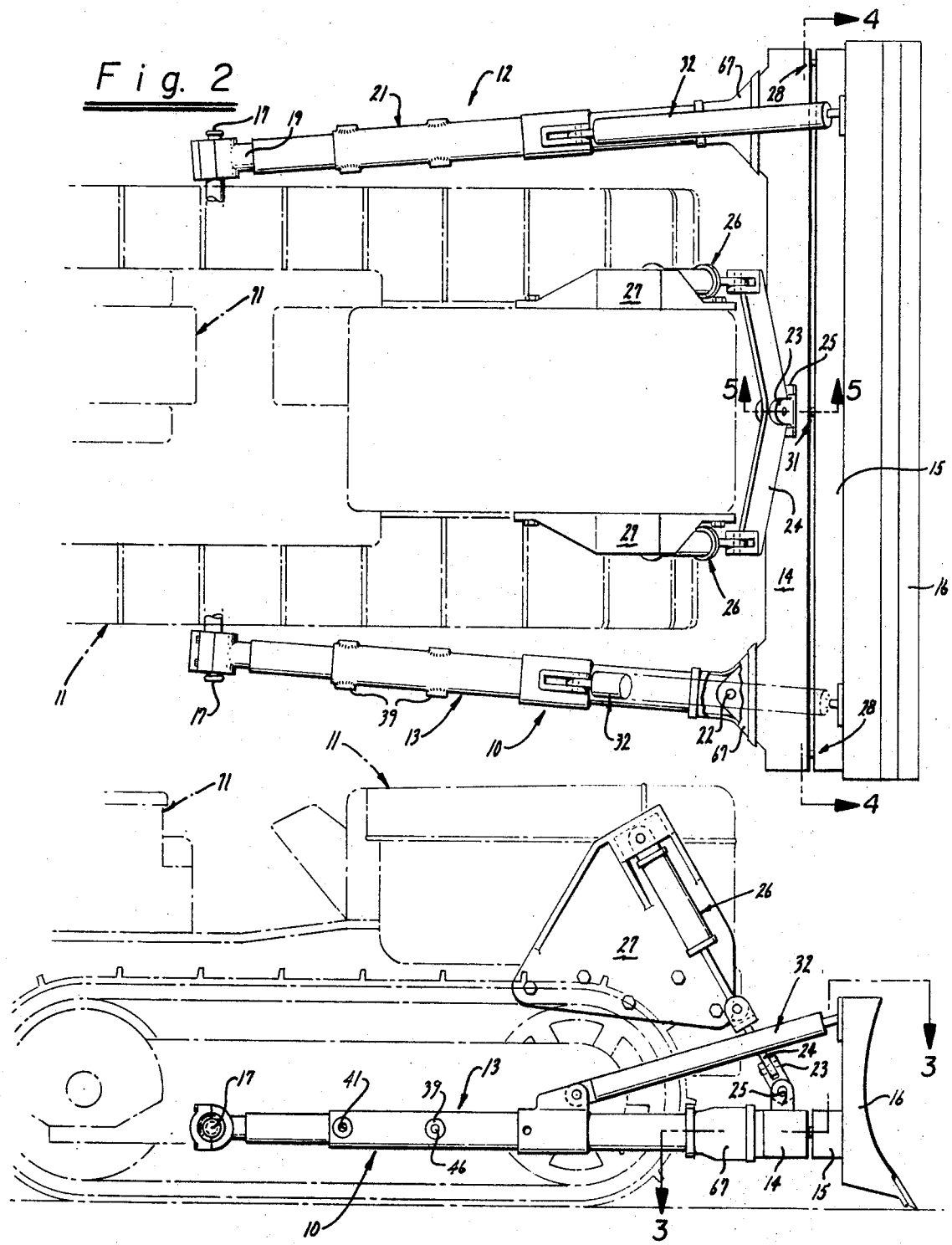

BULLDOZER BLADE AND MOUNTING ASSEMBLY

Filed Nov. 13, 1967          3 Sheets-Sheet 2

INVENTOR.
James C. Farris
BY Flehr, Hohbach, Test,
Albritton & Herbert
Attorneys

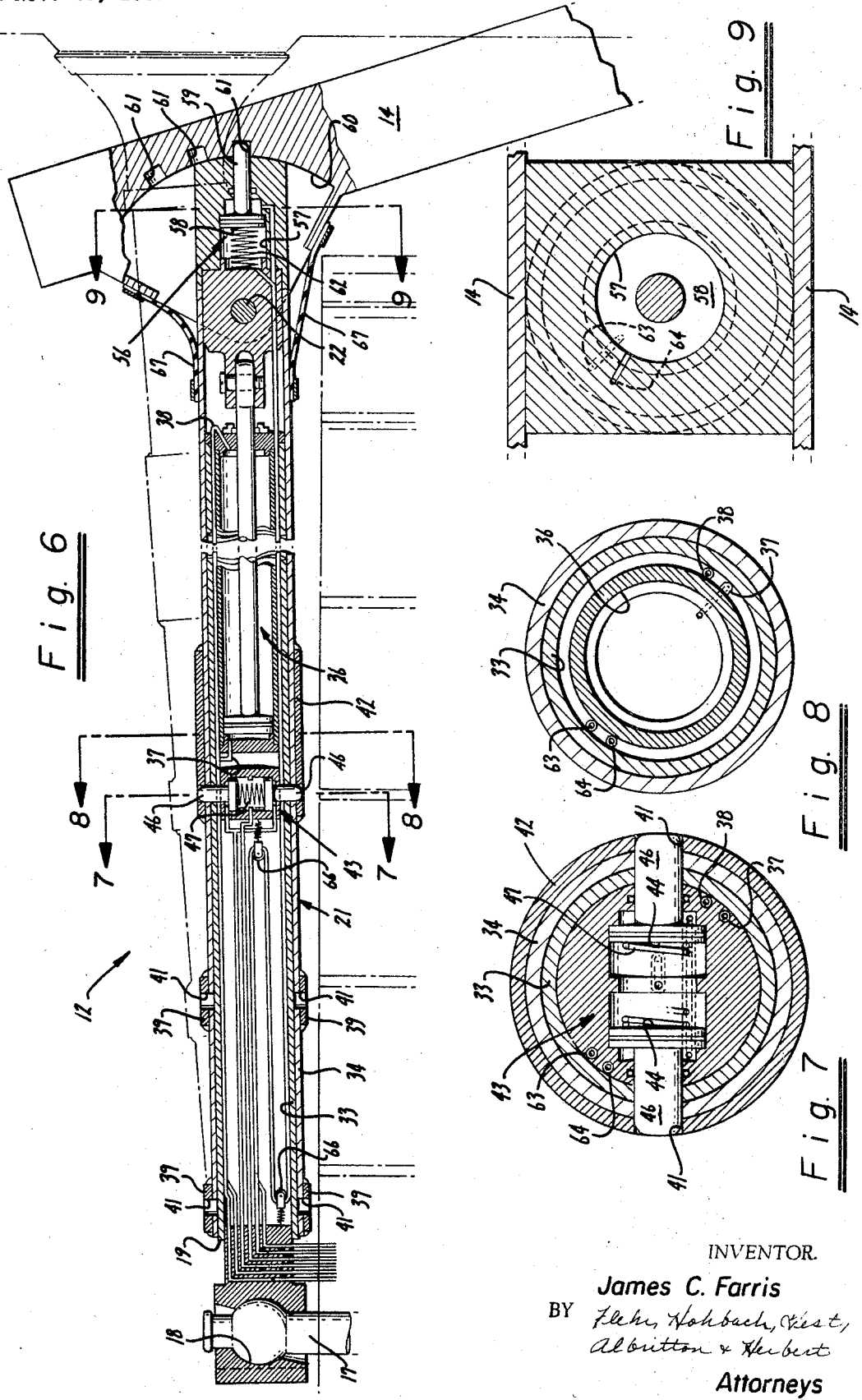

United States Patent Office 3,521,714
Patented July 28, 1970

3,521,714
BULLDOZER BLADE AND MOUNTING ASSEMBLY
James C. Farris, P.O. Box 123, Redway, Calif. 95560
Filed Nov. 13, 1967, Ser. No. 682,423
Int. Cl. E02f 3/76
U.S. Cl. 172—804
2 Claims

ABSTRACT OF THE DISCLOSURE

The apparatus permits fixing in a positive position the blade of a bulldozer, either normal to the longitudinal axis of the vehicle or at lateral angular relation with respect thereto. The blade is angled by lengthening and shortening telescopically related side arm members, and locking members are provided to maintain the side arm members in the selected position. A locking element is also provided to prevent pivoting between the dozer blade mount and the side arm assemblies. Both locking mechanisms and means for moving the side arms are powered by hydraulics.

BACKGROUND OF THE INVENTION

This invention relates generally to a bulldozer blade and mounting assembly, and particularly concerns apparatus for shifting a dozer blade into one of several preselected angular relationships with respect to the dozer, and for locking the blade in the selected position.

Heretofore the blade and mounting assemblies of bulldozers frequently include hydraulic cylinders for positioning the blade with respect to the dozer vehicle. Hydraulic cylinders are provided to elevate and lower the blade; to change the blade's angle of attack with respect to the ground; and to change the angle of the blade with respect to the line of vehicular travel. Especially in the latter case, once the blade is set into a selected angular position, the hydraulic cylinders become thrust absorbing members in that forces applied to the blade are transmitted back to the vehicle through the reaction force on the liquid and piston of the hydraulic cylinders. This service requires rugged hydraulic cylinders of substantially large capacity to serve the double duty of both positioning the blade and resisting thrust forces transmitted through the cylinders to the vehicle.

In various dozing procedures it is desirable that the dozer blade be fixed or positioned in a preselected lateral angular relationship with the vehicle. Certain of the presently available apparatus provides for continuously angling the blade as shown in the U.S. patent to French 2,950,550, issued Aug. 30, 1960. On the other hand, and as exemplified by the U.S. patent to Lorang 3,059,356, issued Oct. 23, 1962, certain constructions for angling the blade require the operator or the mechanic to dismounted from the vehicle and to shift the blade mounting members from one location to another. The inconvenience and lost machine time are apparent and undesirable.

SUMMARY OF THE INVENTION AND OBJECTS

This invention is a dozer blade and mounting assembly which comprises a dozer blade, a cross beam, means connecting said dozer blade to said cross beam, and a side arm extending along each side of said dozer and pivotally connected at one end to said cross beam. Each side arm includes a base portion for mounting on said dozer, and an elongate member shiftable with respect to said base portion longitudinally of said arm into a plurality of preselected positions for providing various side arm lengths. Power means are provided to shift the elongate member with respect to the base portion, and first power actuated locking means serve in each side arm to lock the elongate member to the base portion for permitting transmission of thrust along the side arm. Second power actuated locking means serve to lock the connection between the side arm and the cross beam against pivotation. The locking means are selectively disengagable to permit the power means to shift the elongate member to another position for varying the angle of the dozer blade and cross beam with respect to the side arms.

A general object of this invention is to provide a dozer blade assembly in which the blade can be conveniently and fixedly set in a plurality of selected working positions.

Another object of the invention is to provide a bulldozer blade assembly constructed so that the work load of thrusts are transmitted from the area of impact on the blade to the frame of the vehicle through rigid structural members, rather than through the liquid and pistons of hydraulic cylinders.

A further object of the invention is to provide a bulldozer blade assembly of the character noted wherein the blade may be angled in a direction facing to the right or left of the vehicle and locked into a selected position without requiring the operator to leave his position on the vehcile.

These and other objects of the invention will become apparent from the following description of an exemplary embodiment of the invention set forth below and shown in the drawings.

BRIEF DESCRIPTION OF THE DRAWINGS

FIG. 1 is an elevational view, from the side, of the bulldozer blade and mounting assembly of the present invention shown mounted upon a crawler tractor vehicle depicted in broken lines;

FIG. 2 is a top plan view of the subject matter shown in FIG. 1;

FIG. 6 is an enlarged, horizontal sectional view taken through the left-hand side arm of the blade assembly as viewed in FIG. 2; and FIGS. 7, 8 and 9 are each transverse sectional views taken in FIG. 6 along the respectively designated section lines there shown.

DESCRIPTION OF THE PREFERRED EMBODIMENT

Figure 3:
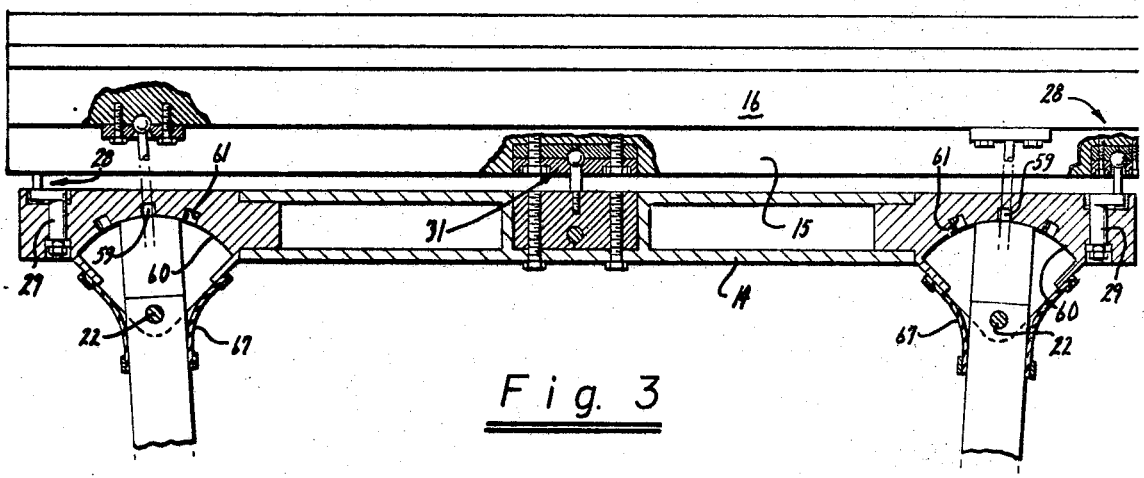
FIG. 3 is a fragmentary sectional view taken in the direction of the arrows along the line 3—3 of FIG. 1.
Figure 4:
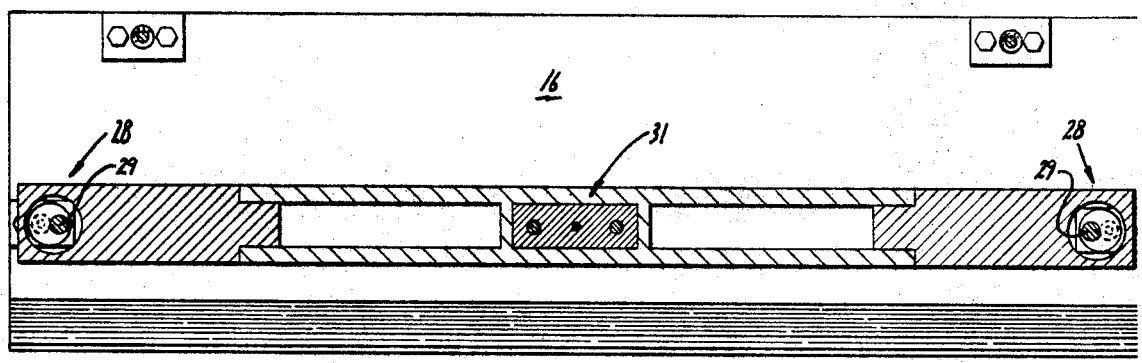
FIG. 4 is a vertical sectional view taken in the direction of the arrows along the line 4—4 of FIG. 2.

A bulldozer blade and mounting assembly 10 embodying the features of the present invention is shown in the drawings, the assembly 10 being shown in FIGS. 1 and 2 operatively mounted upon a crawler tractor vehicle 11 depicted in broken lines. The assembly 10 includes a left hand 12 and a right hand 13 positioning or side arm, the forward end of each being pivotally attached to a cross beam 14 which in turn is connected to a mouldboard or dozer blade 16 at a trio of movement permitting connections 28, 31 along a mounting member 15.

To facilitate raising and lowering the blade 16 as well as angling the blade to right or left, or canting from end to end, each side arm is mounted to the frame of the tractor (not shown herein) in a ball joint connection including a trunnion member 17 (shown best in FIG. 6) which receives thereover a socket 18 rigidly secured to a base portion 19 of each side arm. The socket 18 is constructed to act with the trunnion member 17 as a stop preventing the side arms, first, from moving inwardly and contacting the track gear and second from being angled outwardly from the longitudinal axis of the vehicle further than a predetermined degree. An extendable or shiftable member 21 is telescopically received over the base portion 19 of each side arm, the forward portion of the member 21 carrying the vertically arranged pivot 22 through which the side arm is united to the cross beam 14. A double clevis fitting 23 is movably secured to a pintle 25 centrally mounted along the cross beam 14. The fitting 23 pivotably receives the medial portion of an elevating yoke 24, the ends of which are also pivotably secured to hydraulic cylinder assemblies 26 for raising and lowering the blade assembly 10 with respect to the tractor 11. The elevating cylinder assemblies 26 are suitably mounted upon a sub-frame 27 fixably secured to the vehicle 11. Thus as the yoke 24 is raised or lowered through action of the cylinders 26 the entire blade assembly 10 pivots about the trunnions 17.

Figure 5:
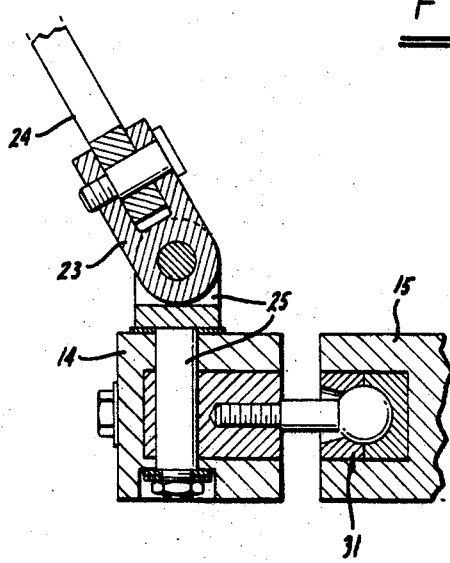
FIG. 5 is a detailed vertical sectional view taken in the direction of the arrows along the line 5—5 of FIG. 2.

To vary the angle of attack or pitch of the blade 16 once a position of the side arms has been selected, three connection points between the blade mounting member 15 and the cross beam 14 are provided to afford movement about a generally horizontal or longitudinal axis. More specifically, at each end of the cross beam there is provided a ball-and-socket joint 28, as shown in FIG. 3, the ball member of which is united to a crank 29 rotatably mounted in the cross beam. A centrally disposed ball-and-socket joint 31 (FIG. 5) is arranged along the cross beam, the ball extending into a socket located in the mounting member 15. It will be understood that the ball elements of the three connections 28 and 31, all lie along a common line or hinge axis which extends generally laterally of the tractor 11 and parallel to the blade 16. Between laterally spaced locations along the upper margin of the blade 16 and extending to the member 21 of each side arm, there is mounted an extendable strut member 32 which includes a hydraulic cylinder assembly that serves to pivot the blade about the hinge axis defined by the universal connections 28 and 31.

The three point connection between the blade and the cross beam also permits the blade to be tilted or canted end for end with respect to the beam about the central connection 31. In this movement the two outwardly disposed crank members 29, adjacent the ends of the cross beam, each rotate oppositely to raise one and lower the other of the respectively associated ball members thereby permitting tilting of the blade about the central joint 31. This motion may be induced by setting the side arms in positions of unequal length and then elevating or lowering the blade assembly with the cylinders 26. Alternatively, unequal extension of the struts 32 will produce the subject tilting action, should it be desired.

Considering particularly FIGS. 6–9, the structure and functions of the side arms are described in detail with reference to the left side arm 12. The base portion 19 includes an inner tubular member 33 and the extendable member 21 includes an outer tubular element 34 which has an inside diameter complementary to the outside diameter of the inner tubular member whereby the tubular elements 33, 34 are slidably and telescopically related.

A double-acting, light-duty hydraulic cylinder 36 is fixedly arranged within the inner member 33 and suitably connected to the outer member 34 so as to permit selective shifting movements of the outer with respect to the inner member for lengthening and shortening the overall length of the side arm. The cylinder 36 is suitably provided with fluid conduits 37, 38 at its inner and outer ends respectively and those conduits as well as others mentioned below are associated with an hydraulic circuit including a pump, valves, filters, heat exchanger, reservoir and controls, all arranged within the skill of the art, and therefore are not described herein.

It is a feature of this invention that each of the side arms may be extended to a plurality of different lengths or positions, and to this end a plurality of pairs of locational bosses 39, two in this embodiment, are rigidly secured along the outer tube 34 at longitudinally spaced positions. In each boss 39 a hole 41 is provided which extends through the outer tube, the holes of bosses on diametrically opposite sides of the tube being in alignment, as shown in FIG. 7. For a like purpose, a collar 42 to which the strut cylinder 32 is secured, is also provided with a diametrically opposed pair of holes 42 which extend through the walls of the outer tubular member 34. The three pairs of holes 41 have axes disposed in a common plane. In pairs, the bosses 39 provide a reinforcement function for the outer tube 34 as well as a locational function for a position locking mechanism 43 disposed within the inner tube 33. It is also apparent that the collar 42 with the holes 41 therein also serves as a reinforcement and locational function similar to the bosses 39.

Considering now the arm position locking means 43 (FIG. 6) the mechanism 43 includes a double acting, double piston, fluid actuated cylinder 45 wherein each piston 44 has arranged thereon an outwardly extending bolt member 46 which may be projected through an associated opening 41 in response to fluid pressure within the cylinder 45 to fixedly lock the outer 34 to the inner 33 tube. The cylinder is designed such that each piston 44 may be hydraulically retracted, i.e., moved to an inner position, to withdraw the bolts 46 from the openings 41, to repose substantially flush with the outer surface of the inner tube 33 thereby unlocking the tubes 33, 34 permitting the outer tube 34 to be shifted by the arm positioning cylinder 36. A compression spring 47 is disposed in the cylinder 45 to bias the pistons 44 outwardly so that when a pair of aligned holes 41 register with the bolts 46, the bolts will project into the hole 41. A safety function of the spring 47 is to maintain the pistons and bolts in the selected holes 41 so should the fluid pressure system fail, the bolts will remain in position locking the side arm in the selected position. It will be understood that the bolts are fabricated from high tensile steel material possessing high shear resistance so that the forces transmitted along the outer tube will be transferred to the inner tubular member through the bolts 46.

When the side arms are positioned so that one is shorter than the other, the cross beam 14 and blade 16 are necessarily disposed with respect to the arms at angles other than 90°. To maintain the cross beam 14 fixedly with respect to each side arm, and in a selected angular position with respect to the tractor 11, cross beam locking, or anti-pivot, mechanisms 56 are provided. More specifically, each of the two cross beam locking mechanisms 56 includes a double acting hydraulic cylinder 57 including a piston 58 on which a forwardly extending bolt member 59 is arranged to project from the end of the arm into one of a plurality of spaced apart holes 61 in the cross beam disposed along a curved recess 60. A compression spring 62 is disposed in the cylinder 57 to bias the piston 58 and bolt 59, the bolt projects into the hole 61. A safety function of the spring 62 is to maintain the piston 58 and bolt 59 in the selected hole 61 so should the fluid pressure system fail the bolt will remain in position locking the side arm and cross beam against pivotation. A pair of fluid conduits 63, 64 serving the cylinder 57 extend along the inner wall of the inner tubular member 33 wherein they are suitably supported by spring mounted tensioners 66 for taking up the slack to reduce the possibility of fouling the flexible conduit lines as the arm member is lengthened or shortened.

To avoid collection of dirt and debris within the recesses 60 and holes 61, a boot 67 of pliable material is suitably arranged about the pivot connection between the cross beam and side arm member.

The operation of the dozer blade assembly 10 is controlled completely from the operator's station 71 on the tractor 11 where there is provided a set of conventional hydraulic controls (not shown) whereby the vehicle operator may supply fluid pressure selectively to either one or both of two arm positioning cylinders 36; to either one or both of the arm position locking mechanisms 43; or to either one or both of the anti-pivot locking mechanisms 56. Controls for actuating the strut cylinders 32 and the elevating cylinders 36 are also provided at the operator's station 71.

When the blade is positioned normal to the longitudinal axis of the vehicle (shown in FIG. 2) the side arms 12, 13 are locked in the intermediate of the three side arm locking positions. In this position the arms are equally extended and are angled outwardly from the longitudinal axis, the outward movement being defined by the mechanical stop afforded by the trunnion 17 and socket 18. To shift the arm members 33 and 34 to the intermediate position the arm members are first unlocked by supplying fluid pressure to each position locking mechanism 43 for retracting the pair of bolts 44 from the associated holes 41 and clear of the outer member 34. The anti-pivot lock mechanisms 56 are also unlocked by supplying fluid pressure to the cylinder 57 thereby retracting the bolt 59 from the hole 61. The arm positioning cylinders 36 are actuated to withdraw the piston for shifting the outer tubular member 34 towards the desired position. A suitable interlock may be provided in the hydraulic circuit (not shown) to preclude actuation of the arm positioning cylinders 36 before retraction of the locking bolts 46 and 59.

As the outer tubular member 34 is shifted towards the point where the holes 41 in the collar 42 are in registration with the bolts 46, fluid pressure in the locking cylinder 44 is reversed and together with the compression spring 47 urge the bolts 46 outwardly into the next set of holes 41 thereby to lock the outer to the inner tubular member. Fluid pressure is maintained in the cylinders 44 to assure that the bolts 46 remain in locking relationship. In this manner a rigid dozer blade assembly is afforded and thrust is transmitted to the tractor frame through structural tubular members as contrasted to transmitting the thrust to the frame through hydraulic cylinders.

When it is desired to angle the blade with respect to longitudinal axis of the vehicle 11 (as shown by full lines in FIG. 6), one side arm is extended to lock in the forwardmost locking position (FIG. 6) while at the same time the blade locking bolts 59 are repositioned into selected holes 61 to give the blade the desired angle with respect to the longitudinal axis of the vehicle. When the selected angle of the blade has been reached and the bolts are permitted to extend into the recess or openings 41 and 61, hydraulic pressure is again applied to the respective locking cylinders to maintain the blade fixedly in the selected position.

In view of the foregoing, it is apparent that there has been provided an improved dozer blade and mounting assembly which is variable between a plurality of preselected angular positions and which permits tilting of the blade from end to end about an axis transverse to the vehicle. The assembly makes efficient use of the mechanical inner-connecting elements so that the dozing forces are transmitted mechanically to the vehicle and are not transmitted through the hydraulic cylinders. This permits lower duty cylinders to be employed with a consequent reduction in costs.

While there has been described what is at present considered to be the preferred embodiment of the invention, it will be understood that various modifications may be made therein, and it is intended to cover in the appended claims all such modifications as fall within the true spirit and scope of the invention.

I claim:

1. A multiple-position blade assembly for a dozer comprising a side arm extending along each side of the dozer, a cross-beam pivotally connected to a forward end portion of each side arm and arranged at the front of said dozer to extend generally laterally thereof, a dozer blade, cross-beam pivotal connecting means serving to mount said dozer blade upon said cross-beam for pivoting said blade about an axis generally parallel to the length of said cross-beam, first remotely controlled power cylinder means extending between said dozer blade and at least one of said side arms serving to pivot said blade about said axis, second remotely controlled power cylinder means mounted upon said dozer and connected to said blade assembly, serving to raise and to lower said blade assembly with respect to said dozer, each side arm comprising tubular, telescopically extendable forward and rearwardly disposed members, means pivotally connecting each rearwardly disposed side arm member to the dozer, first lockable means disposed in each side arm including first registering means in said side arm members serving to define a plurality of predetermined lengths of said side arms, first lock bolt means movable into interengaging relation with said first registering means, third remotely controlled power cylinder means connected to said first lock bolt means disposed within said tubular side arm for selectably shifting said lock bolt means between interengaged and disengaged positions with respect to the selected first registering means, second lockable means disposed between said cross-beam and each side arm including, second registering means in said cross-beam and the side arm serving to define a plurality of dozer blade angles correlating with said predetermined lengths of said side arms, second lock bolt means movable into interengaging relation with said second registering means, fourth remotely controlled power cylinder means connected to said second lock bolt means disposed within said tubular side arm for selectively shifting said second lock bolt means between interengaged and disengaged positions with respect to the selected second registering means, and fifth remotely controlled power cylinder means arranged within said tubular side arm members serving to extend and retract said forwardly disposed side arm member with respect to the rearwardly disposed member when said first and second lockable means are unlocked.

2. The dozer blade assembly set forth in claim 1 wherein said cross-beam pivotal connecting means includes: a first ball joint connectingly arranged centrally of the ends of the cross-beam and dozer blade, and, at least a second ball joint connectingly arranged proximate one end of said cross-beam and blade, said second joint being arranged on a crank permitting the ends of the dozer blade to be raised and lowered with respect to the ends of the cross-beam.

References Cited

UNITED STATES PATENTS

| | | | |
|---|---|---|---|
| 1,861,731 | 6/1932 | Wooldridge | 172—808 X |
| 2,059,431 | 11/1936 | Barrett et al. | 172—804 |
| 2,075,482 | 3/1937 | Thorpe | 172—805 |
| 2,088,564 | 8/1937 | Anthony et al. | 172—805 X |
| 2,108,466 | 2/1938 | Allin et al. | 172—805 |
| 2,187,072 | 1/1940 | Le Bleu | 172—805 |
| 2,730,823 | 1/1956 | Cassidy | 172—805 |
| 3,264,943 | 8/1966 | Schmitt | 92—28 X |
| 3,400,767 | 9/1968 | Hermiz | 172—805 |

ROBERT E. BAGWILL, Primary Examiner

A. E. KOPECKI, Assistant Examiner

U.S. Cl. X.R.

92—24; 172—806